J. W. WINNINGHAM.
CUTTER HEAD SETTER.
APPLICATION FILED NOV. 12, 1909.
Reissued Apr. 25, 1916. 14,122.
Fig. 3
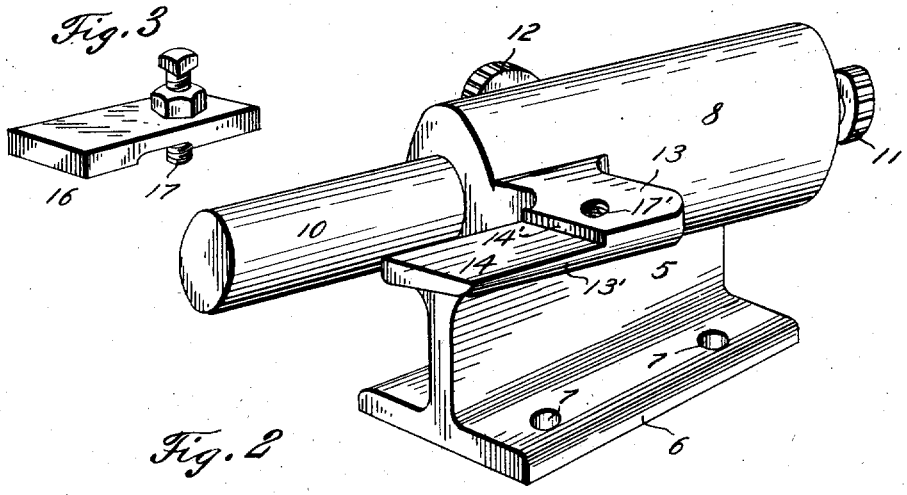
Fig. 2
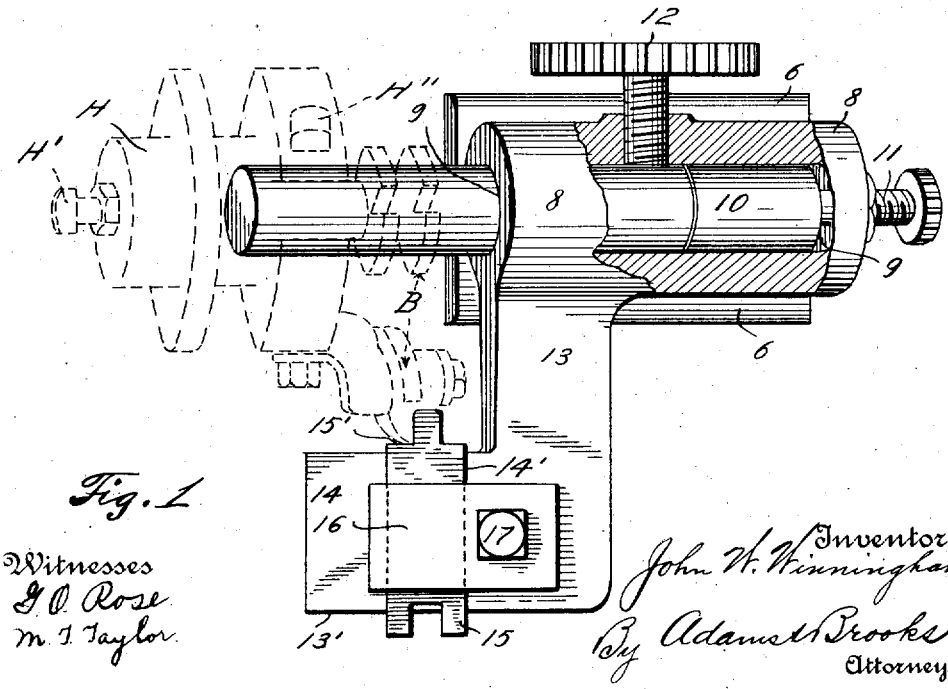
Fig. 1
Witnesses
G. O. Rose
M. T. Taylor
Inventor
John W. Winningham
By Adams & Brooks
Attorneys
THE COLUMBIA PLANDGRAPH CO., WASHINGTON, D. C.

UNITED STATES PATENT OFFICE.

JOHN W. WINNINGHAM, OF SEATTLE, WASHINGTON.

CUTTER-HEAD SETTER.

14,122. Specification of Reissued Letters Patent. Reissued Apr. 25, 1916.

Original No. 871,053, dated November 12, 1907, Serial No. 351,845. Application for reissue filed November 12, 1909. Serial No. 527,749.

*To all whom it may concern:*

Be it known that I, JOHN W. WINNINGHAM, a citizen of the United States of America, and a resident of the city of Seattle, in the county of King and State of Washington, have invented certain new and useful Improvements in Cutter-Head Setters, of which the following is a specification.

Figure 1 is a plan view partly in section, of devices embodying my invention; Fig. 2 is a perspective view of the same with the clamping plate with which the gage is secured removed; and Fig. 3, a perspective view of the gage clamping plate shown detached.

This invention relates to cutter or matcher heads such as are employed with wood-planing machines; and its object is the provision of apparatus whereby the cutter-bits or knives may be accurately set with relation to the head and likewise furnish means whereby the latter can be reliably held in various positions so that the several bits can be most conveniently filed to bring them to sharp edges.

The invention consists in the novel construction and combination of features as will be hereinafter described and claimed.

In said drawings, the reference numeral 5 represents a standard having an enlarged base 6 which is provided with apertures, such as 7, whereby the apparatus may be secured by bolts to the horizontally arranged top of a work bench. At the top of said standard is a cylindrical boss 8 which is chambered, as at 9, to provide a socket for the end of a mandrel 10 which carries the cutter-head and furnishes the support therefor. This socket has its axis disposed at an inclination from said base so as to hold the mandrel in such an inclined position and with the outer end of the latter uppermost, in order that a cutter-head when seated thereon will have a tendency to press toward the adjacent end of the boss and be retained on the mandrel by its weight alone.

11 is a screw extending through the rear of the boss to impinge against the socketed end of the mandrel and serves as an adjustable step bearing therefor; while a radially disposed set screw 12 is employed through the side of the boss to engage the mandrel for securing the same to any set position.

Extending laterally from the boss is an arm 13 with a rectangularly and forwardly directed outer portion 13′ having in the upper surface of the latter a depressed planed face 14 which provides a seat for the gage and also a shoulder 14′ whereagainst an edge of the gage will abut. The gage seating face 14 is arranged to incline at an angle corresponding with the axis of the mandrel, while the shoulder 14′ is formed at right angles to both the said seating-face and the mandrel axis. The object of thus arranging the seat and the shoulder abutment is to insure the gage which is employed being held true to the work, which is of extreme importance as will be understood to those familiar with the art.

15 represents a gage formed of a sheet of metal, desirably, and has along its edge 15′ the counterpart to the finished molded or matched surface of the work which is to be accomplished with the cutter-head and to which the bits or knives thereof are to be set. The gage is held in operative position upon the aforesaid seat by a clamping plate 16 which is secured to the arm by a screw 17 inserted through an aperture of the plate and into a screw-threaded hole 17′ of the arm 13. For a clearer understanding of the functions of the before described parts of the invention I represent by broken lines H in Fig. 1, a cutter-head with its adjusting and securing screws H′ and H″, respectively, and with cutter bits B attached.

In operation, the head is placed upon the protruding end of the mandrel and is moved longitudinally by manipulating either or both of the screws H′ or 11 to present the bits into such relation that they will, upon being revolved with the head register with the gage, or approximately so, and then be individually adjusted by devices for controlling the cutter carriers upon the head to successively bring them into such registry with the gage. To sharpen the bits, the head would be rigidly secured to the mandrel by the set-screw H″ and after rotating these parts to bring a cutter-bit into convenient position to be filed they are thus locked by the screw 12 for the operator to work in bringing the cutter to its proper edge. When one cutter is filed the mandrel is released from screw 12 to allow of the head being turned to present another cutter to be operated upon, which is sharpened after the mandrel has been secured by this bolt, and so on until all have been sharpened.

The advantages obtained by this invention reside in its simplicity involving few parts which are not liable to become deranged. The gage is held in a rigid position and is at all times within easy view of the operator who can try his cutter therewith by simply turning the head. It also affords an efficient support for the head when filing the cutters and by the inclined support for the head the head can when loose be turned about without fear of its moving endwise of the mandrel.

What I claim as my invention, is—

1. In a device of the character described, the combination with the mandrel, a support for the mandrel, an arm integral with said support and provided with a seat for a gage, and means to clamp a gage to said arm, of means for adjustably moving said mandrel longitudinally relatively to the support, and means to secure the mandrel in various set positions.

2. In a device of the character described, the combination with a mandrel, a standard having a socket with an inclined axis and an extended base, an arm extending laterally from the socket and provided with a seat for a gage which is arranged in the same angle of inclination with the axis of the socket, said seat also terminating in an abutment perpendicular to said axis, an adjustment screw extending longitudinally into said socket, a set screw extending transversely into the socket, and means to clamp a gage to said seat.

3. In a device of the character described, the combination with a mandrel, a standard having a socket with a horizontally inclined axis and an extended base, an arm extending laterally from the socket and provided with a seat for a gage which terminates in an abutment perpendicular to said axis, an adjustment screw extending longitudinally into said socket, a set screw extending transversely into the socket, and means to clamp a gage to said seat.

4. In a device of the character described, the combination with a mandrel, a standard provided with an extended base and a socket for the mandrel, said socket having its axis inclined from the plane of said base, a gage holder, an adjustable end bearing for the mandrel extending axially into the socket, and means to secure the mandrel against said end bearing and also against rotary motion.

5. In a device of the character described, the combination with a mandrel, a standard provided with an extended base and a socket for the mandrel, said socket having its axis inclined from the plane of said base, a gage holder formed integral with the standard, and an adjustable end bearing for the mandrel extending axially into the socket.

6. In combination with a mandrel, a support therefor, an arm integral with said support formed with a gage seating face and a gage engaging shoulder at right angles thereto, and means to clamp the gage, said means overlying the gage and being secured to said arm.

7. In combination with a support, a mandrel adjustably secured to said support, an arm rigid with said support having a depressed horizontal gage seating face, and means on said arm to secure the gage in position.

8. In combination with a support, a mandrel therein, means engaging one end of said mandrel for adjusting the same lengthwise, an arm rigidly connected to said support and having a flat horizontally disposed gage seating face, and means to clamp a gage on top of said seating face.

9. In combination with a support having a socket therein formed with a closed end, a mandrel in said socket, a set screw extending through said closed end of the socket and engaging said mandrel, a flat gage seating face carried by said support adapted to have a gage seated thereon, and a clamping plate to overlie the gage and secure the same to said gage seating face.

10. In combination with a support having a socket therein, a mandrel extending in the socket, means to adjust said mandrel lengthwise, an arm on the support, said arm being formed with a depressed flat gage-seating face forming a shoulder against which one side of the gage abuts, and a clamping plate engaging the top of the gage and the opposite side of the gage.

11. In a device for gaging cutters of cutter heads, in combination, a supporting stand, a mandrel, means for supporting the mandrel with its axis inclined to the base of the stand and with its upper end projecting to receive the cutter head, a gage and means for supporting said gage from the stand in position to register with the cutters of a head mounted on the spindle.

12. In combination with a base or supporting frame, having a mandrel receiving socket with its axis inclined to the supporting surface of the base, a mandrel fitting said socket and with its higher end projecting to receive a cutter head, an arm carried by the base and having gage-seating surfaces forming a guideway, which extends perpendicular to the axis of the mandrel.

13. In a device for gaging cutters of cutter heads, in combination, a base, a spindle mounted on the base for axial adjustment with its axis inclined to the supporting surface of the base and its higher end projecting to receive the cutter head, a gage member and means supporting the gage opposite the cutter head receiving portion, for accurate adjustment radially of the axis of the spindle, and means whereby the said gage may be adjusted radially of the spindle axis.

Signed at Seattle, Washington, this 5 day of November, 1909.

JOHN W. WINNINGHAM.

Witnesses:
WALTER B. ALLEN,
DAVINA SMITH.

Copies of this patent may be obtained for five cents each, by addressing the "Commissioner of Patents. Washington, D. C."